March 14, 1967 J. D. MOULTON ET AL 3,308,648
GAS MEASURING METHOD AND APPARATUS
Filed Sept. 12, 1963 2 Sheets-Sheet 1

INVENTORS
JOSEPH D. MOULTON
PHILIP F. GRIEGER
BY THEODORE L. TREITLER

George H. Fritzinger
AGENT

March 14, 1967  J. D. MOULTON ET AL  3,308,648
GAS MEASURING METHOD AND APPARATUS
Filed Sept. 12, 1963  2 Sheets-Sheet 2

INVENTORS
JOSEPH D. MOULTON
PHILIP F. GRIEGER
BY THEODORE L. TREITLER

George H. Fritzinger
AGENT

United States Patent Office 3,308,648
Patented Mar. 14, 1967

3,308,648
GAS MEASURING METHOD AND APPARATUS
Joseph D. Moulton and Philip F. Grieger, West Orange, and Theodore L. Treitler, Millburn, N.J., assignors, by mesne assignments, to Chemetron Corporation, Chicago, Ill., a corporation of Delaware
Filed Sept. 12, 1963, Ser. No. 308,407
11 Claims. (Cl. 73—23)

This invention relates to a new and improved method and apparatus for detecting and/or measuring a selected constituent gas in a gaseous mixture, and more particularly it relates to such method and apparatus which is adapted for making successive independent measurements at a preset rate.

The invention is particularly useful for measuring the percentage content of carbon dioxide in a gaseous stream, and is herein described in connection with a rebreathing apparatus for measuring the carbon dioxide content of the respiratory gases in such system. However, the use of the invention in connection with a rebreathing system is an illustrative one and therefore no unnecessary limitation of the invention thereto is intended.

The only device heretofore available on the market for continuously measuring the carbon dioxide content of the respiratory gases in a rebreathing or anesthetizing apparatus is of the infrared absorption type. However, this type of instrument is very expensive and presents a potential explosion hazard when used with anesthetic gas-oxygen mixtures because it employs a hot wire as the infrared source. The present invention can analyze gas mixtures for content of carbon dioxide in a well-nigh continuous manner without presenting any explosion hazard. As will appear, the invention is carried out preferably by dropping a liquid in the gas stream which is capable of absorbing or reacting with the gaseous constituent under measurement and of undergoing a measurable change in its characteristics in response to such absorption or reaction. The drops are measured successively for the change in a selected characteristic to determine the percentage of carbon dioxide gas. Although the invention is described in connection with the measurement of carbon dioxide as the constituent gas, it will be understood that the principles of the invention are applicable as well to the measurement of the content of other constituent gases.

An object of the invention is to provide a method and apparatus for checking a gaseous mixture for content of a given gaseous constituent which is very simple in construction and operation.

Another object is to provide a safe and reliable method and apparatus for measuring the content of carbon dioxide gas in an anesthetic gas mixture without presenting any explosion hazard.

Another object is to provide an improved method and apparatus of a liquid-drop type for making successive independent measurements of a gaseous constituent in a gas stream by measuring an effect which the gaseous constituent has on each drop after the drop has been in contact with the gas stream for a given period.

These and other objects and features of the invention will be apparent from the following description and the appended claims.

In the description of the invention reference is had to the accompanying drawings, of which:

Figure 1:
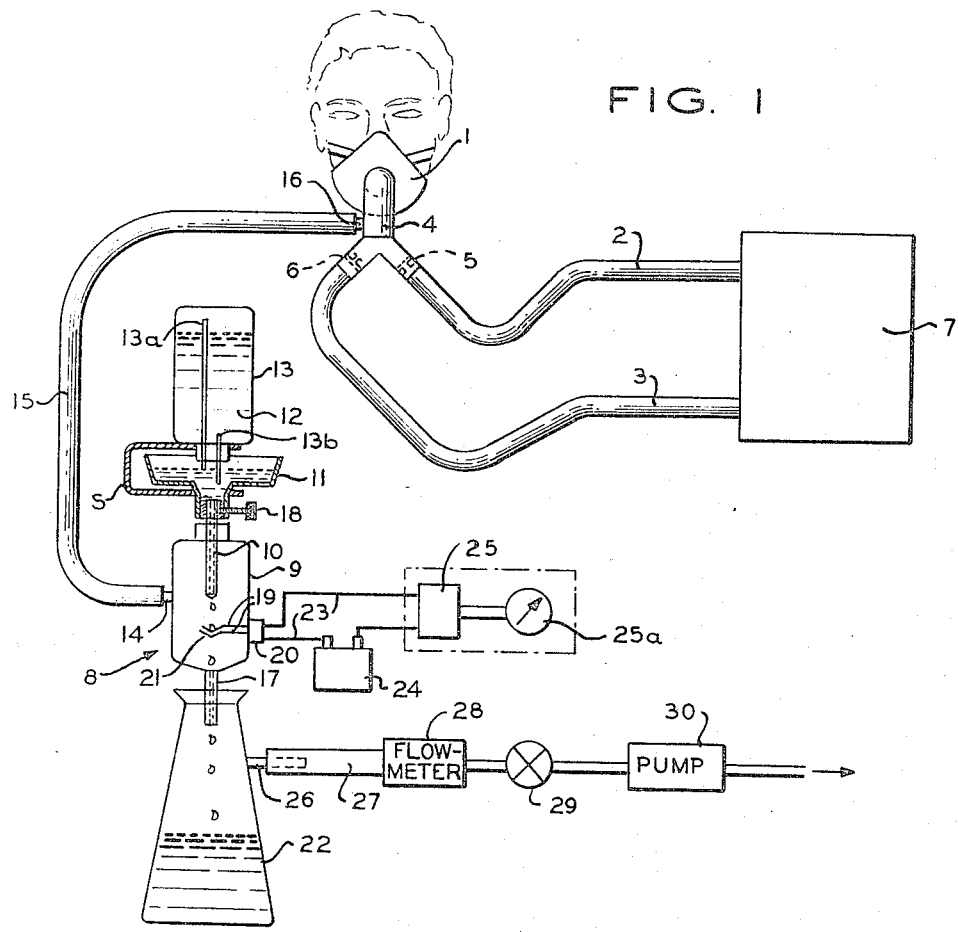
FIGURE 1 is a view of a rebreathing apparatus showing a preferred embodiment of detector cell according to the invention for measuring the percentage content of carbon dioxide in the respiratory gases.

The rebreathing system shown in FIGURE 1 comprises a mask 1 for attachment to the face of a patient, flexible inlet and outlet tubes 2 and 3 connected to the inlet and outlet sides of a rigid Y tube 4 leading from the mask and having respective one-way inlet and outlet valves 5 and 6, and an anesthetizing machine 7 diagrammatically shown connected between the outer ends of the flexible inlet and outlet tubes 2 and 3. The anesthetizing machine comprises a breathing bag, means for introducing oxygen and anesthetic gases, and a canister containing carbon dioxide absorbent material through which the respiratory gases are passed to extract the carbon dioxide from the exhalant of the patient. Such anesthetizing machine may be of a standard type and need not be herein described in detail.

In order that an anesthetist may properly control a re-breathing system it is necessary to know constantly the percentage content of carbon dioxide gas in the respiratory gases so as not to allow the percentage content ever to reach such level that it could have toxic effects on the patient. The present invention provides a safe and reliable apparatus and method for measuring the carbon dioxide content of the respiratory gases on a well-nigh continuous basis without impeding the free flow of the respiratory gases in the system and without presenting any explosion hazard. In a preferred embodiment the invention shown in FIGURE 1 a small percentage of the respiratory gases is drawn from the respiratory system, preferably directly from the patient as from the Y tube 4 at a rate of the order of 250 to 400 mls. per minute, and is fed through a detector cell 8 according to the invention. This detector cell is of a liquid-drop type wherein water is dropped into a chamber through the respiratory gases drawn from the rebreathing system to expose each drop for a given interval to a successive portion of the gases and enable the drop to absorb carbon dioxide gas according to the percentage content of the gas in the gaseous stream. Each drop is caught by a small conductivity cell and held until displaced by the next succeeding drop. While each drop is so held its conductivity is measured. Since the conductivity varies according to the amount of absorption of carbon dioxide gas, and the absorption in turn depends upon the percentage content of carbon dioxide gas in the gaseous stream under measurement, the conductivity is a direct indication of the percentage content of the carbon dioxide gas in the respiratory gases of the rebreathing system.

As shown in FIGURE 1, the detector cell 8 comprises a container or chamber 9 preferably cylindrically shaped and made of Lucite (methyl methacrylate). Extending through an upper neck of the chamber 9 in sealed relation thereto is a dropper tube 10 having a 60° conical tip and a 1/32" diameter center hole. Preferably, the dropper tube is made of Teflon (polytetraflouroethylene) or of like materials such as Kel-F (polychlorotrifluoroethylene) because these materials are non-wettable and permit the size of the drops to be held constant. This dropper tube leads from the bottom wall of a tray 11 in which water is maintained at a constant level from an inverted bottle 12 by gravity feed in the manner of the usual water fountain. At the level of the lower end of the dropper tube 10 the container 9 has a side inlet 14 which is connected by a flexible tube 15 to a side outlet 16 of the Y tube 4. As is later described, respiratory gases are drawn from the rebreathing system through the flexible tube 15 into the container 9 and downwardly out of the container through a bottom stem 17.

For better flow characteristics through the dropping tube the water supply is provided with a small percentage of a wetting agent such as 0.025% Tergitol NPX or Dowfax 9N10, a non-ionic nonyl phenol ethoxylated with 10 moles ethylene oxide. This wetting agent should not be provided substantially in excess of the amount here specified else it will interfere with the conductivity response of the water to the $CO_2$ gas. The dropping rate is controlled by a plastic set screw 18 threaded through a collar on the dropper tube. By maintaining a constant head from the supply source a constant dropping rate is obtained for any setting of the set screw 18. A satisfactory dropping rate is two drops per second requiring then a one liter supply of water for an 8 hour period.

About one and one-quarter inches below the end of the dropper tube there is provided a pair of horizontal side-by-side wires 19 which are made preferably of black platinized platinum and which are lead out of the container 9 through a sealed glass stem 20. The wires 19 are preferably spaced about 0.05 inch apart and are optionally provided with upright V-shaped end portions forming a V cradle 21 which is capable of catching a single drop of water from the dropper tube and of holding the same by surface tension until the same is dislodged by a next succeeding drop. When each drop is dislodged from the V cradle it falls to the bottom of the container 9 and runs out through the stem 17 into a flask 22.

Figure 1A:
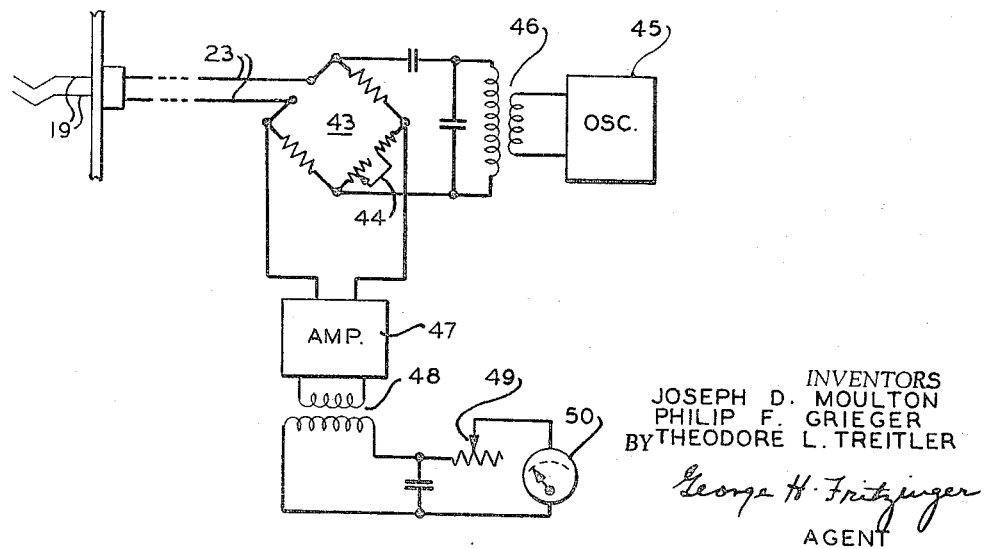
FIGURE 1A shows a preferred electrical measuring circuit for the detector cell shown in FIGURE 1.

During the time that each drop is falling from the dropper tube 10 through the gas stream into the cradle 21 and during the moment the drop is retained in the cradle the drop of water is absorbing or reacting with the carbon dioxide in the gaseous stream in proportion to the percentage content of the carbon dioxide gas. Each drop is thus exposed to the stream of gas for a definite interval before the drop is measured for conductivity. By this fixed exposure each drop absorbs or reacts with the quantity of carbon dioxide gas depending upon the percentage content of the gas in the gaseous stream. When the drop rate is one per second or more a test rate is provided sufficient to keep up with normal breathing cycles—i.e., to give several checks during each cycle. Moreover, at such drop rate each drop undergoes such short period of electrolysis during the time of measurement that a simple D.C. measuring circuit may be used. Thus, the two wires 19 may be connected in a measuring circuit 23 serially including a battery 24, a zero adjusting network 25 diagrammatically indicated, and a D.C. meter 25a calibrated in percentage content of carbon dioxide gas. Preferably, however, an A.C. measuring circuit is employed as shown in FIGURE 1A. Such circuit comprises a resistance bridge 43 having one arm constituted by the electrodes 19 and having a null-adjusting rheostat 44 in another arm. The bridge is supplied with a low A.C. voltage at a frequency of, for example, 200 c.p.s. as from a battery operated oscillator 45 (diagrammatically indicated) through a transformer 46. Connected diagonally across the bridge 43 is an amplifier 47 (diagrammatically indicated) connected at its output through a transformer 48 and a zero adjusting rheostat 49 to an A.C. microammeter 50. This microammeter, like the D.C. meter 25a, is calibrated in percentage content of carbon dioxide gas in the gaseous stream. Alternative to using such direct indicating meters 25a or 50, the output terminals of the measuring circuit may be connected to a continuous MV recorder to provide a permanent chart showing the variation in the percentage content of carbon dioxide gas in the rebreathing system plotted against time. Such chart, for example, is shown in FIGURE 2.

An advantage of the A.C. measuring circuit above-described is that it permits the electrode wires 19 to be replaced by Kovar wires sealed in a glass rod. The response versus carbon dioxide gas with the Kovar wires in an A.C. circuit was found to be as good as with platinum wires and to be consistent day after day without any evidence of polarization. In the A.C. measuring circuit electrode wires of tungsten or nickel may also be used.

In order to provide for a constant flow of gas from the rebreathing system to the detector cell 8 the flask 22 is provided with an outlet 26 to which is connected a duct 27 serially including a flow meter 28, a valve 29 and a vacuum pump 30 leading to the outside atmosphere. Alternatively, the outlet of the vacuum pump could be connected back into the rebreathing system but since the gas drawn from the rebreathing system by the detector cell 8 for measuring the percentage content of the carbon dioxide constituent is extremely small, being less than one percent of the respiratory gases, a return flow to the rebreathing system is unnecessary.

Figure 2:
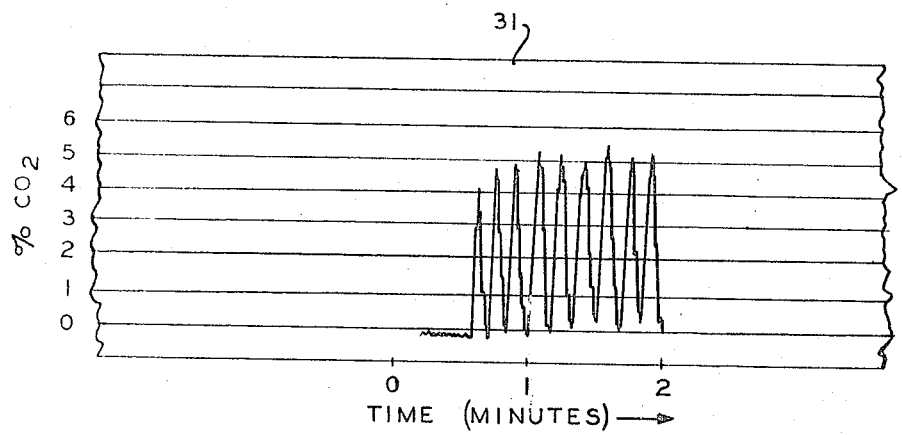
FIGURE 2 is a chart record of a continuous recording analyzer connected to the detector cell of FIGURE 1, showing a typical example of variation in the carbon dioxide content of the respiratory gases in a closed rebreathing system.

The tape chart 31 in FIGURE 2 shows the output of the recorder 25 over several breathing cycles at a breathing rate of six cycles per minute. The abscissa axis is calibrated in time and the ordinate axis is a measure of the milliamperes in the measuring circuit 23 calibrated in percentage content of carbon dioxide gas in the respiratory gases drawn from the rebreathing system.

Figure 3:
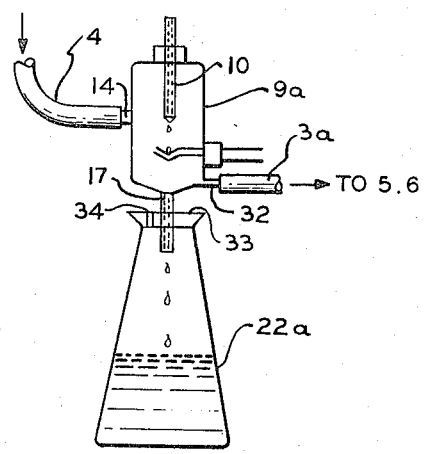
FIGURE 3 is a fractional view illustrating an alternative way of connecting a detector cell of the invention to a rebreathing system.

Alternative to bleeding off a small portion of the respiratory gases from the rebreathing system as shown in FIGURE 1, the chamber 9 of the detector cell 8 may be serially connected in the Y tube 4 by providing the container 9a corresponding to the container 9 of the embodiment in FIGURE 1 with a side outlet 32 which is coupled directly to the valves 5 and 6 as shown in FIGURE 3. This outlet tube 32 is positioned at the bottom of the container so that the stream of the gas flow in the rebreathing system will lead from an upper portion of the container 9a at a level with the bottom of the dropper tube 10 downwardly to the bottom of the container 9a through the side outlet 32. This direct serial connection of the container 9a of the detector cell in series with the rebreathing system is permitted because the container 9a provides no impedance to the free flow of respiratory gases in the system. In this embodiment the outlet components 26 to 30 are eliminated and the flask 22a corresponding to the flask 22 of the previous embodiment has no side outlet but the stopper 33 through which the stem 17 of the container 9a extends is provided with an air escape outlet 34.

Figure 4:
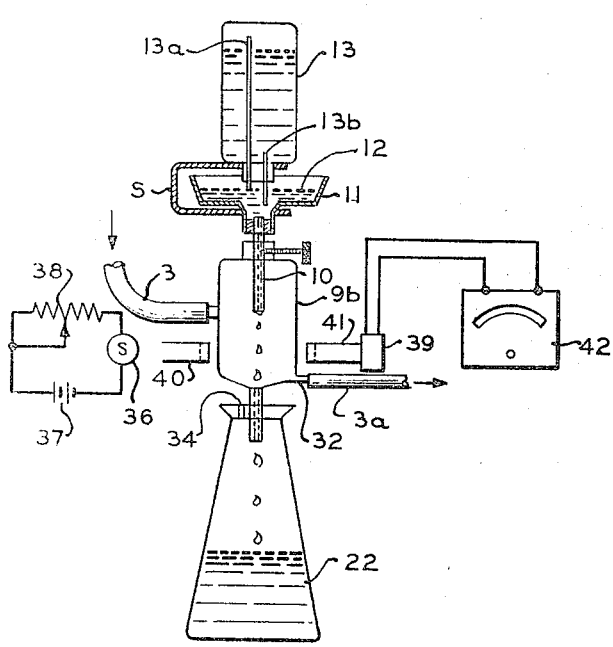
FIGURE 4 is a diagrammatic view of an alternative form of detector cell according to the invention.

The embodiment of our invention shown in FIGURE 4 illustrates the liquid-drop principle applied to measuring the carbon dioxide content of a gas stream wherein the liquid drops undergo a change in character different from a conductivity change as described in the previous embodiment. The liquid dropped into the gas stream is in this case one which forms a precipitate or is decolorized when exposed to carbon dioxide gas and may be, for example, a barium hydroxide solution. This solution is supplied to the dropper tube 10 by a fountain 11–13 which maintains a constant level or hydrostatic head, the same as in FIGURE 1. The solution falls from the dropper tube through a reaction chamber 9b which may be the same as the corresponding chamber 9a in FIGURE 2, except that the conductivity wires 19 and the mounting therefor are eliminated. The respiratory gas stream under measurement may be that in the outlet tube 3 of the rebreathing system shown in FIGURE 1, in which case it may enter the chamber 9b at the upper inlet 14 and may leave the chamber at the lower side outlet 32, or vice versa.

As the solution of barium hydroxide falls in drops from the dropper tube 10 through the gas stream it reacts with the carbon dioxide gas forming barium carbonate. Each drop in falling a given distance has the same exposure to the gas stream and will absorb or react with carbon dioxide to an extent in proportion to the percentage content of the carbon dioxide in the gas stream. Barium carbonate is more opaque than barium hydroxide with the result that the opacity becomes an indication of the amount of carbon dioxide taken up by each drop. As a means of measuring the opacity a beam of light from a light bulb 36 connected to a battery 37 through a rheostat 38 is directed through the reaction chamber 9b to a photocell 39 by a pair of collimating tubes 40 and 41 so that the light beam traverses the path of the falling drops. The photocell is connected for example to a microammeter 42 which is calibrated in terms of the percentage content of carbon dioxide in the gas stream. As the percentage of carbon dioxide in the gas stream rises, each drop absorbs more carbon dioxide and becomes more opaque to decrease the light transmission and gives a lower reading on the microammeter. Since the drops fall at a constant rate the minimum readings of the meter fluctuations give an accurate indication of the percentage content of carbon dioxide in the gas stream.

It is to be understood that the foregoing specific examples are intended to be illustrative and not necessarily limitative of our invention since the same is subject to other changes and modifications without departure from the scope of our invention, which we endeavor to express according to the following claims.

We claim:

1. Apparatus for measuring a gaseous constituent of a gas stream, comprising means for dropping a liquid into said gas stream having the capability of undergoing a measurable change in its characteristics in response to contact with said gaseous constituent, a holder in said stream for catching said drops, said holder comprising a pair of spaced elements capable of catching respective drops of said liquid and holding each drop by surface tension with each held drop being displaced by a new drop as the latter falls thereon, and means for measuring each drop for said change in its characteristic while the drop is retained by said holder.

2. The apparatus set forth in claim 1 wherein said dropping means comprises a dropper tube with a conical tip made of polytetrafluoroethylene.

3. Apparatus for measuring the content of carbon dioxide gas in a gas stream comprising a chamber for directing the flow of said gas stream, means for dropping essentially pure water into said chamber to allow the water drops to contact the carbon dioxide gas in said stream and to undergo a change in the conductivity thereof according to the amount of carbon dioxide gas taken up by each drop, a holder in said chamber for catching said drops, said holder comprising two side-by-side electrodes having V-shaped end portions at the path of said falling drops for holding each drop by surface tension until the drop is displaced by each new drop falling onto the holder, and means connected to said electrodes for measuring the conductivity of each drop while the same is held between said electrodes.

4. The apparatus set forth in claim 3 wherein said measuring means comprises a bridge network having one arm constituted by said electrodes, means for supplying an A.C. voltage across said bridge network, an amplifier connected diagonally across said bridge, and a measuring instrument connected to the output of said amplifier.

5. Apparatus for measuring the exhalant in a rebreathing system for carbon dioxide content comprising a chamber through which said exhalant is conducted in a given direction, means for dropping a liquid in said chamber having the property of undergoing a measurable change in its characteristics when it contacts carbon dioxide gas, a holder in a lower portion of said chamber comprising a pair of elements with adjacent end portions at the path of said falling drops for catching the drops individually and holding each drop until the same is displaced therefrom by a new drop falling thereon, means responsive to each drop on said holder for measuring the same for said change in its characteristic, said measuring means including an indicating instrument calibrated in percentage content of carbon dioxide gas in said exhalant, and means for draining off from the bottom of said chamber the liquid dripping from said holder.

6. The apparatus set forth in claim 5 including a vacuum pump connected to the outlet end of said chamber for drawing said exhalant through said chamber via said draining means.

7. The method of measuring a gaseous constituent of a gas stream which comprises passing successive discrete portions of a liquid through said gas stream at a predetermined rate and distance, said liquid portion being responsive to contact with said gaseous constituent and undergoing a measurable change in its characteristics in accordance with the extent of said contact, exposing each said discrete portion of said liquid to said gaseous constituent for a predetermined interval to effect a measurable change in the characteristics of each said discrete liquid portion, holding said successive portion when the same is passed through said predetermined distance through said stream and measuring each discrete portion for said change in its characteristics while said portion is so held.

8. The method as defined in claim 7 wherein said gas stream contains carbon dioxide, said liquid is water and each portion is measured for conductivity while being momentarily held.

9. Apparatus for measuring a gaseous constituent of a gas stream comprising means to introduce a gas stream into a zone, means for forming discrete drops of a liquid and for dropping said liquid into said gas stream in a manner to expose each said drop to said gaseous constituent for a given interval to effect a measurable change in the characteristics of each said drop and means to measure each drop for said change in its characteristics.

10. The apparatus as defined in claim 9 wherein said means to measure each drop for said change in characteristics includes a holding means to catch each drop and retain such during measurement.

11. The apparatus as defined in claim 9 wherein said means to measure each drop for said change in characteristics includes means for directing a beam of light on to the path of said drops and to measure the variation in said light beam responsive to said drops.

References Cited by the Examiner

UNITED STATES PATENTS

| | | | |
|---|---|---|---|
| 2,492,768 | 12/1949 | Schaefer | 73—335 |
| 2,935,154 | 5/1960 | Kelley | 55—19 |
| 3,001,917 | 9/1961 | Scheirer | 204—1.1 |
| 3,158,446 | 11/1962 | Sternberg et al. | 23—254 |

RICHARD C. QUEISSER, *Primary Examiner.*